(12) United States Patent
Gerndorf et al.

(10) Patent No.: US 8,388,039 B2
(45) Date of Patent: Mar. 5, 2013

(54) TRIM PART FOR A MOTOR VEHICLE

(75) Inventors: Ralf Gerndorf, Finnentrop (DE); Frank Schneider, Altena (DE); Ahmet Halilcavusogullari, Werdohl (DE)

(73) Assignee: Dura Automotive Body & Glass Systems GmbH, Plettenberg (DE)

( * ) Notice: Subject to any disclaimer, the term of this patent is extended or adjusted under 35 U.S.C. 154(b) by 671 days.

(21) Appl. No.: 12/386,386

(22) Filed: Apr. 17, 2009

(65) Prior Publication Data
US 2009/0267373 A1 Oct. 29, 2009

(30) Foreign Application Priority Data
Apr. 22, 2008 (DE) .......................... 10 2008 020 151

(51) Int. Cl.
*B60J 7/00* (2006.01)

(52) U.S. Cl. ................................. 296/1.08; 296/193.06
(58) Field of Classification Search ............. 296/193.06, 296/1.08
See application file for complete search history.

(56) References Cited

U.S. PATENT DOCUMENTS

| 4,493,506 A | 1/1985 | Alexander |
| 7,055,291 B2 * | 6/2006 | Nakanishi et al. ............ 52/716.5 |
| 7,686,386 B2 * | 3/2010 | Marks et al. ............. 296/193.06 |

FOREIGN PATENT DOCUMENTS

| DE | 2438367 | 2/1976 |
| DE | 4316438 | 4/1994 |
| EP | 1621407 | 2/2006 |
| EP | 1759927 | 3/2007 |

* cited by examiner

*Primary Examiner* — Joseph Pape
(74) *Attorney, Agent, or Firm* — Dilworth & Barrese, LLP.

(57) ABSTRACT

A trim part for a vehicle has a base part (1) and a design part (2) including a bulge (16) adjacent a rim (15).

19 Claims, 2 Drawing Sheets

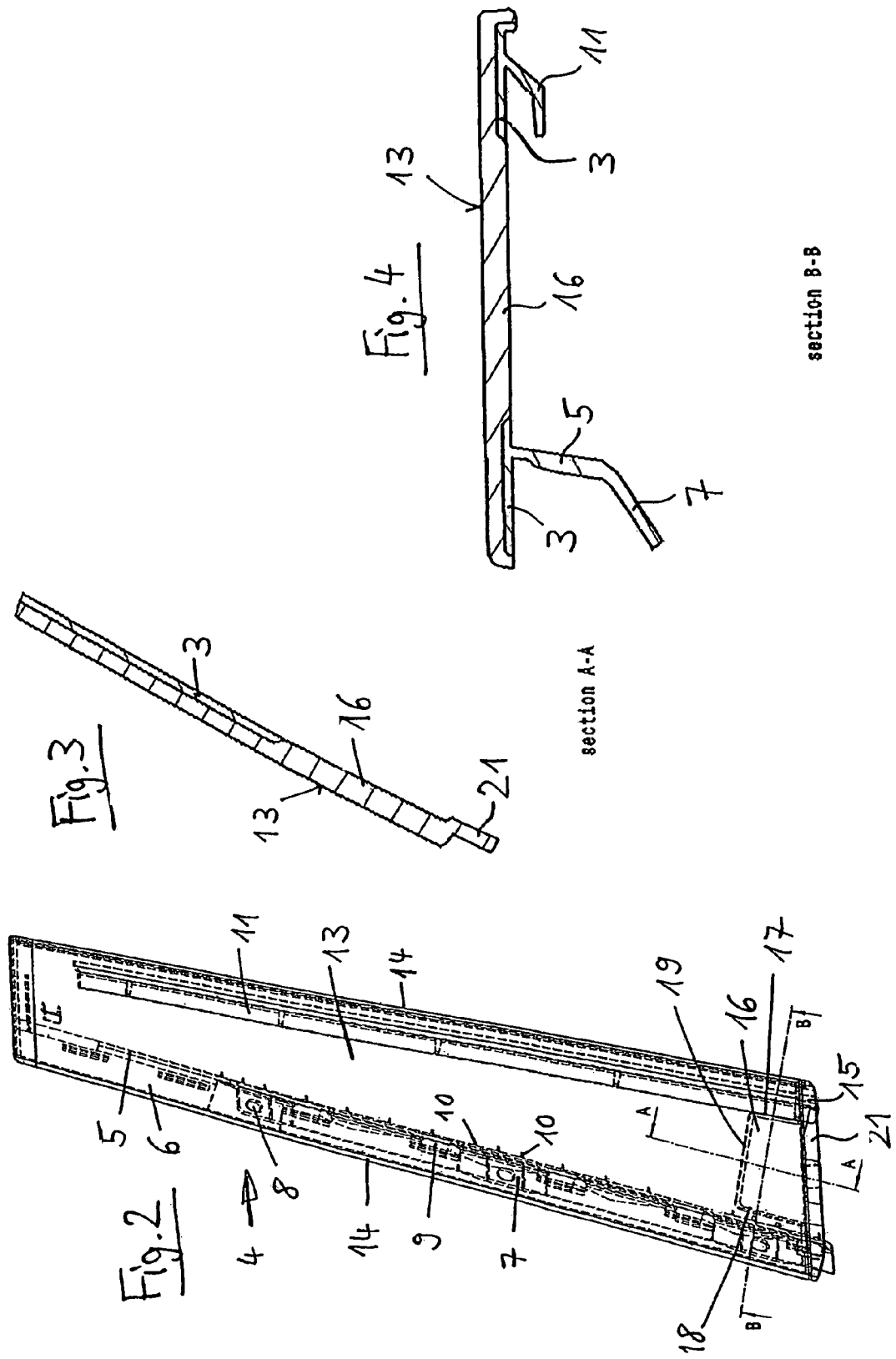

TRIM PART FOR A MOTOR VEHICLE

BACKGROUND OF THE INVENTION

This invention relates to a trim part for a vehicle, in particular for a motor vehicle. This invention furthermore relates to a tool and a method for manufacturing such trim part.

SUMMARY OF THE INVENTION

It is the object of the invention to propose an improved trim part for a vehicle, in particular for a motor vehicle.

In accordance with the invention, this object is solved by the features herein. The trim part comprises a base part and a design part. The base part performs a mechanical function, in particular a mounting function and/or one or more further mechanical functions. The design part, which also can be referred to as external part or visible part, has a surface which is visible in the mounted condition, i.e. in the condition connected with the vehicle or motor vehicle. The trim part can be provided for the inside or for the outside of a vehicle or motor vehicle.

The trim part is made of plastics. It is manufactured by a two-component method. In this method, one of the two parts, preferably the base part, is manufactured first. Subsequently, the other part, preferably the design part, is manufactured in the same tool.

The design part has a bulge adjacent to a rim of the design part. This bulge involves the advantage that the trim part can be manufactured largely free from tension. When manufacturing the trim part by a two-component method, a high melt pressure is obtained in the vicinity of the sprue, i.e. in the region in which the plastic material is introduced into the mold, which in particular in the case of components with a relatively low wall thickness leads to undesired tensions in the component. Due to the bulge which the design part has adjacent to a rim, it is possible to manufacture this part free from tension or largely free from tension.

By means of the invention, all kinds of trim parts can be manufactured, in particular trim panels and pillar trims for the pillars of a motor vehicle.

Advantageous developments are described in the description herein.

Advantageously, the base part has an indentation or recess corresponding to the bulge. In this way, a uniform total thickness of the trim part can also be achieved in the vicinity of the bulge of the design part.

A further advantageous development is characterized in that the bulge has an edge on a side facing away from the rim. The edge can extend at right angles or obliquely to the rim or to the longitudinal extension of the part. It serves to build up a uniform back pressure when introducing the plastic material into the mold corresponding to the design part.

This invention furthermore relates to a tool for manufacturing a trim part in accordance with the invention. Advantageously, the tool is characterized in that the mold for manufacturing the design part has an edge which serves to produce the edge on the side of the bulge facing away from the rim.

This invention finally relates to a method for manufacturing a trim part of the invention by a tool in accordance with the invention.

BRIEF DESCRIPTION OF THE DRAWINGS

One embodiment of the invention will subsequently be explained in detail with reference to the attached drawing, in which:

FIG. 2 shows a pillar trim of FIG. 1 in a front view,
FIG. 3 shows a section along line A-A of FIG. 2,
and
FIG. 4 shows a section along line B-B of FIG. 2.

DESCRIPTION OF THE PREFERRED EMBODIMENTS

Figure 1:
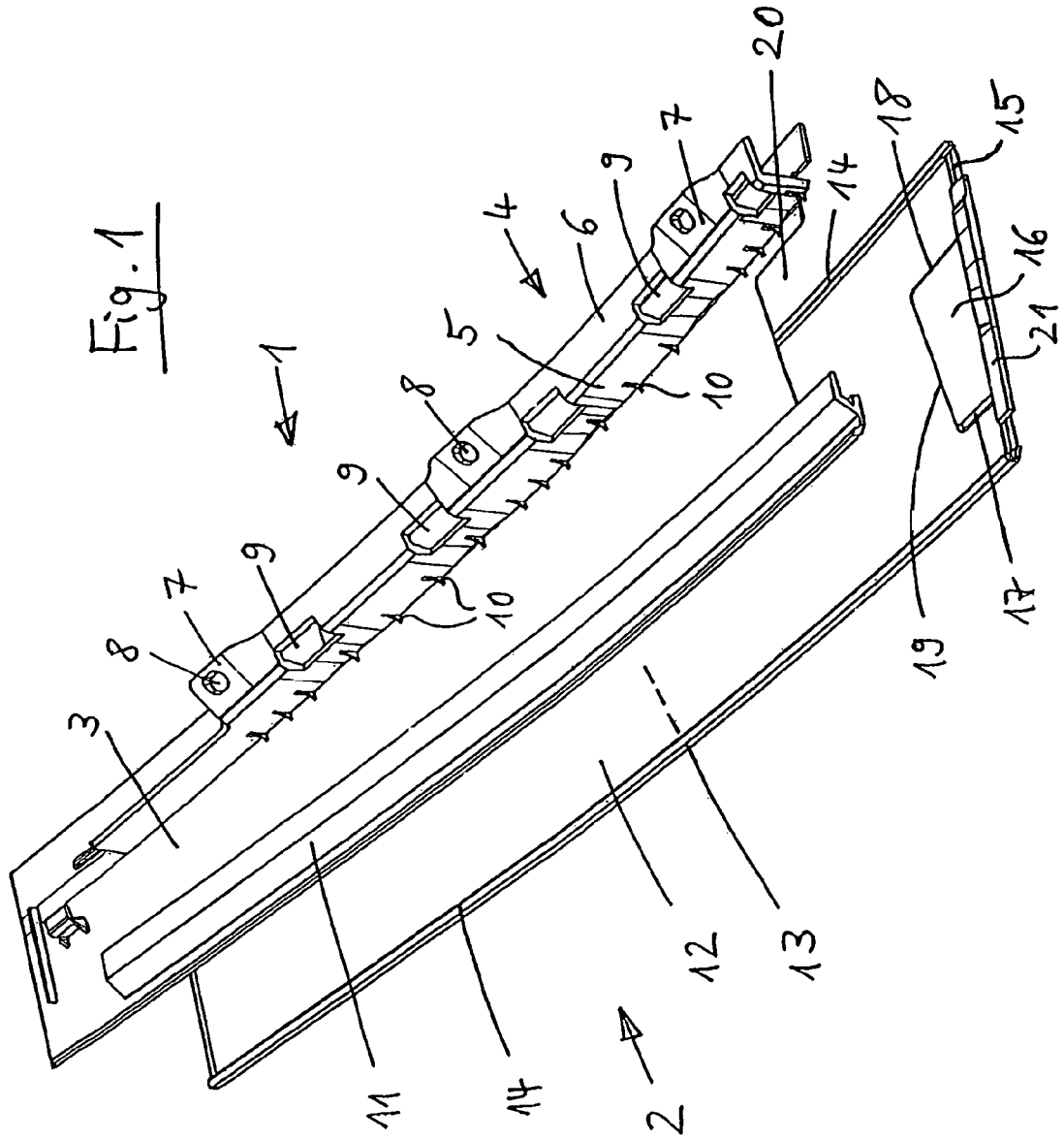
FIG. 1 shows a pillar trim of a motor vehicle in a perspective representation.

The pillar trim for the B-pillar of a motor vehicle, which is shown in the Figures, consists of a base part 1 and a design part 2, which are shown separately in FIG. 1 for reasons of better depictability in the drawing. The base part 1 comprises an elongated, slightly curved main surface 3, whose long sides converge under an acute angle and whose short sides extend substantially parallel to each other. On a long side of the base part 1 a glass guiding channel 4 is provided, which has an L-shaped profile from which a leg 5 protrudes at approximately right angles to the main surface 3, and the other leg 6 points to the outside parallel to the main surface 3. In the mounted condition, the L produced by the legs accommodates a window of the motor vehicle. The leg 6 parallel to the main surface 3 includes mounting surfaces 7 extending at an angle thereto, in which mounting holes 8 are provided, which form screw points for screwing the base part 1 to the motor vehicle. In the region in which the legs 5, 6 of the glass guiding channel 4 adjoin each other, recesses 9 configured as windows are provided, which form sealing grooves, in which hook-like protrusions of a sealing can be engaged. Furthermore, the leg 5 of the glass guiding channel 4 protruding from the main surface 3 is reinforced by ribs 10.

In the vicinity of the other long side of the base part 1, a bend-over 11 is provided, which has an L-shaped profile open towards the glass guiding channel 4. The bend-over 11 serves for attachment to a body flange of the motor vehicle, on which it can be fitted and to which it can be screwed.

The design part 2 comprises a main surface 12 facing the base part 1. On the opposite side, the visible surface 13 is provided. In the mounted condition connected with the motor vehicle, the visible surface 13 is visible from outside or from inside. In particular, this can be a high-gloss surface or some other surface with the desired surface properties in terms of color, gloss, metallic appearance and the like. On its longitudinal rims, the design part 2 each includes an elevation 14 directed towards the base part 1, by which the longitudinal rims of the main surface 3 of the base part 1 are concealed.

The design part 2 includes a bulge 16 adjacent to a rim 15 of the design part 2. The bulge 16 is located on the side of the main surface 12 of the design part 2, i.e. on the side facing away from the visible surface 13. Accordingly, the bulge 16 faces the base part 1. The rim 15 is located on a short side of the design part 2.

The rim 15 forms the main injection point of the design part 2. The rim 15 hence is the rim through which the plastic material is injected into the mold of the tool. In the case of the pillar trim shown in the drawing, film gating is effected, i.e. a gating in which the plastic material substantially is injected across the entire width of the rim 15.

The lateral boundaries 17, 18 of the bulge extend substantially parallel to and at a distance from the longitudinal rims 14 of the design part 2. The terminal boundary 19 of the bulge 16, which is spaced from the rim 15, extends substantially at right angles to the longitudinal extension of the design part 2, as can in particular be taken from FIG. 2.

In its main surface 3, the base part 1 includes a recess 20, which in its size and shape corresponds to the bulge 16. The thickness of the bulge 16 substantially is as great as the wall thickness of the main surface 3 of the base part 1. Hence, the total wall thickness of base part 1 and design part 2 everywhere substantially is the same. In the case of a greater wall thickness of the base part 1 and/or a smaller thickness of the bulge 16, a corresponding indentation facing the design part 2 might also be provided in the base part 1 instead of the recess 20, in order to everywhere achieve the same total wall thickness.

During injection molding, the edge in the injection molding tool, which produces the rear terminal boundary 19 of the bulge 16, acts such that a largely uniform back pressure is built up.

In the vicinity of the rim 15, a strip 21 is provided on the design part 2, which upon installation of the pillar trim rests against the shaft strip of the body or of the vehicle door.

In the embodiment, the base part 1 has a wall thickness of 1.3 mm, and the design part 2 has a wall thickness of 2.2 mm. The total wall thickness across the entire region of the trim part consisting of base part 1 and design part 2 hence is 3.5 mm. As a material for the base part 1, ABS and PC-ABS are particularly useful, and as material for the design part 2 PMMA is particularly useful. Furthermore, a third component can be used, which preferably is made of TPE. The following pairs of materials are particularly useful:

PMMA/ABS
PMMA/PC-ABS
PMMA/ABS/TPE
PMMA/PC-ABS/TPE

Depending on the application, the materials can be processed with and without filler.

By means of the invention, it becomes possible to produce a part free from tension in the vicinity of the sprue and/or on other relevant points of the part in the case of two-component parts. This is particularly important in optically demanding parts such as trim panels, in particular pillar trims. This invention can, however, be employed in all kinds of trim parts.

According to the prior art methods, it only was possible with great difficulty to manufacture trim parts, in particular trim panels, free from tension in the vicinity of the sprue. Large deviations in the parts are caused by an excessive influence of the melt pressure in the parts. Furthermore, tests of the parts could not be met, in which the two-component part was subjected to alternating temperatures, for instance between −40° C. and +80° C., by repeated turns.

By means of the invention, it becomes possible to manufacture two-component trim parts with a relatively small total wall thickness of 3 to 3.5 mm. The invention can also be employed in trim parts which have more than 2 components, i.e. in three-component parts and parts with even more components.

The invention claimed is:

1. A trim part for a vehicle, comprising
a base part (1) having an elongated, slightly-curved main surface (3), and
a separate design part (2) having a narrow side and bulge (16) adjacent to a rim (15) extending along the narrow side of the design part (2),
with the base part (1) additionally comprising a recess (20) situated and configured to conform in size and shape to the bulge (16) on the design part (2) such that the thickness of the bulge (16) is the same as the thickness of a layered combination of the base and design parts (1, 2) adjacent to but spaced from the bulge (16) and recess (20) and
the base and design parts (1, 2) being formed from plastic in a two-component procedure with one of said base and design parts (1, 2) first being formed in a mold and then the other of said base and design parts (1, 2) being formed in the same mold.

2. The trim part according to claim 1, wherein the bulge (16) has an edge (19) on a side facing away from the rim (15).

3. A tool for manufacturing a trim part according to claim 1.

4. The tool according to claim 3, wherein the mold for manufacturing the design part (2) includes an edge for producing an edge (19) on the side of the bulge (16) facing away from the rim (15).

5. A method for manufacturing a trim part for a vehicle by a tool according to claim 3, comprising the step of injecting molten plastic into a mold of the tool and allowing the plastic to cool.

6. A tool for manufacturing a trim part according to claim 2.

7. The tool according to claim 6, wherein the mold for manufacturing the design part (2) includes an edge for producing the edge (19) on the side of the bulge (16) facing away from the rim (15).

8. A method for manufacturing a trim part for a vehicle by a tool according to claim 4, comprising the step of injecting molten plastic into a mold of the tool and allowing the plastic to cool.

9. The trim part according to claim 1, wherein
the main surface (3) comprises long sides converging at an acute angle and short sides extending substantially parallel to each other,
a glass guiding channel (4) is provided on one of the long sides of the main surface (3) and has an L-shaped profile, in turn, having a first leg (5) protruding at an approximately right angle to the main surface (3) and a second outer leg (6) extending substantially parallel to the main surface (3) and including mounting surfaces (7) extending at an angle to the second outer leg (6),
mounting holes (8) are provided in the mounting surfaces (7),
recesses (9) are provided in a region where the first and second legs (5,6) adjoin one another, and
ribs (10) reinforce the first leg (5).

10. The trim part according to claim 9, wherein a bend-over (11) is provided in the vicinity of the other long side of the main surface (3) and has an L-shaped profile opening towards the glass guiding channel (4).

11. The trim part according to claim 1, wherein the design part (2) comprises
a main surface (12) facing the base part (1),
on an opposite side of the main surface (12), a visible surface (13), and
longitudinal rims of the main surface (12) having an elevation (14) facing the base part (1) and arranged for concealing longitudinal rims of the main surface (3) of the base part (1), and
lateral boundaries (17, 18) of the bulge (16) extending substantially parallel to, and at a distance from, the longitudinal rims (14) of the design part (2).

12. The trim part according to claim 11, wherein the bulge edge (19) is spaced away from the rim (15) and extends substantially at a right angle to a longitudinal extension of the design part (2).

13. The trim part according to claim 12, additionally comprising a strip (21) in the vicinity of the rim (15) of the design part (2).

14. The trim part according to claim 9, wherein the design part (2) comprises
a main surface (12) facing the base part (1), on an opposite side of the main surface (12), a visible surface (13), and on longitudinal rims of the main surface (12) having an elevation (14) facing the base part (1) and arranged for concealing longitudinal rims of the main surface (3) of the base part (1), and lateral boundaries (17, 18) of the bulge (16) extending substantially parallel to, and at a distance from, the longitudinal rims (14) of the design part (2).

15. The trim part according to claim 14, wherein the bulge edge (19) is spaced away from the rim (15) and extends substantially at a right angle to a longitudinal extension of the design part (2).

16. The trim part according to claim 15, additionally comprising a strip (21) in the vicinity of the rim (15) of the design part (2).

17. The trim part according to claim 14, wherein a bend-over (11) is provided in the vicinity of the other long side of the main surface (3) and has an L-shaped profile opening towards the glass guiding channel (4).

18. The trim part according to claim 15, wherein a bend-over (11) is provided in the vicinity of the other long side of the main surface (3) and has an L-shaped profile opening towards the glass guiding channel (4).

19. The trim part according to claim 16, wherein a bend-over (11) is provided in the vicinity of the other long side of the main surface (3) and has an L-shaped profile opening towards the glass guiding channel (4).

* * * * *